United States Patent [19]

Andrew et al.

[11] Patent Number: 4,863,607
[45] Date of Patent: Sep. 5, 1989

[54] METHOD FOR REMOVING AMINE FROM OIL

[75] Inventors: John E. Andrew, Renton; Howard R. Herrigel, Seattle; George R. Jones, Renton; James C. Nowak, Kent; Mark K. Tose, Maple Valley; Robert Whalen, Kent, all of Wash.

[73] Assignee: Resources Conservation Co., Bellevue, Wash.

[21] Appl. No.: 81,933

[22] Filed: Aug. 3, 1987

[51] Int. Cl.$^4$ ............................................. B01D 11/00
[52] U.S. Cl. .................................. 210/634; 210/708; 203/79; 203/85; 203/95; 203/96; 203/72
[58] Field of Search ...................... 203/79, 85, 96, 95, 203/72, 211; 210/708, 634

[56] References Cited

U.S. PATENT DOCUMENTS

| | | | |
|---|---|---|---|
| 2,276,089 | 3/1942 | Ragatz | 203/1 |
| 2,846,376 | 8/1958 | McCormick et al. | 203/96 |
| 2,848,386 | 8/1958 | Kramis | 203/79 |
| 3,899,419 | 8/1975 | Emanuel | 210/22 |
| 3,925,201 | 12/1975 | Ames | 210/22 |
| 4,002,562 | 1/1977 | Ames et al. | 210/22 |
| 4,056,466 | 11/1977 | Peters | 210/10 |
| 4,230,534 | 10/1980 | Stewart | 203/1 |
| 4,262,791 | 4/1981 | Lynch et al. | 203/1 |

Primary Examiner—Bernard Nozick
Attorney, Agent, or Firm—Seed and Berry

[57] ABSTRACT

The present invention is a method for using water to remove amine from an oil-amine component. The oil-amine component is typically produced in prior art processes using an amine having an inverse critical solution temperature with water to break emulsions and sludges. The steps of the present invention include adding water to the oil-amine component in an amount sufficient to form a water-amine azeotrope with substantially all the amine in the oil-amine component followed by heating to remove the azeotrope. The method of the present invention may be used to remove amine from an oil-amine component even where the amine is present in an amount as low as 10% or less by weight.

60 Claims, 1 Drawing Sheet

METHOD FOR REMOVING AMINE FROM OIL

TECHNICAL FIELD

The present invention relates in general to a method for using water to remove an amine from an oil-amine component produced in a process for breaking oil-water emulsions or sludges, which process uses an amine having an inverse critical solution temperature with water. More specifically, the present invention teaches a method for removing substantially all amine from an oil-amine component, wherein the amine is present even in a amount as low as 10% or less, by weight, in the oil-amine component, and a method for controlling the amount of water necessary for said separation.

BACKGROUND OF THE INVENTION

A method for dewatering sludges by use of an amine or mixture of amines having an inverse critical solution temperature with water is described and claimed in Emanuel, U.S. Pat. No. 3,899,419 issued Aug. 12, 1975 and assigned to the assignee hereof. Improvements in such method are disclosed in Ames, U.S. Pat. No. 3,925,201, and Peters, U.S. Pat. No. 4,056,466.

In addition, Ames et al., U.S. Pat. No. 4,002,562, named above teaches a method for breaking emulsions containing oil and water, and sludges containing solid matter, oil, and either bound water or unbound water. The method taught by Ames is applicable to a wide range of oil-water emulsions, including oil-in-water emulsions, and water-in-oil emulsions, and finds particular utility in the processing of waste emulsions, which have been difficult to process with known methods. According to the process taught in Ames '562, an amine, or mixture of amines, having an inverse critical solution temperature with water is added to an emulsion or sludge such that the temperature of the resulting mixture is at a temperature below the inverse critical solution temperature. If solid matter is present, it can be physically separated from the remainder of the mixture by a variety of known separation techniques, such as centrifugation or filtration. After separation of the solid matter, the remainder of the mixture is more or less a homogenous mixture of water, oil, and amine. When the temperature of the water-oil-amine mixture is raised above the inverse critical solution temperature of the amine, two components are produced: a water component containing small amounts of amine, and an oil-amine component containing small amounts of water.

Ames '562 provides for recycling of amine by removing the amine from the oil-amine mixture by known methods, for example, by distillation of the amine, leaving behind the oils. However, recovering the amine from the amine-oil mixture using known methods has proven to be very difficult and has resulted in unacceptable quantities of the amine remaining in the oil, particularly if the oil is to be recycled for further uses.

In practicing the process taught by Ames '562, the preferred amine, triethylamine, is removed from the oil-amine mixture by the low temperature distillation, leaving behind the non-volatile oil. Triethylamine has a normal boiling point of 89.8° C. (vapor pressure equal to 760 mm#Hg), while an oil having a molecular weight of approximately 1,000 has a high boiling point with initial boiling starting typically at over 300° C. and a smoke point in excess of 200° C.

When the oil-amine mixture is heated moderately, for example by drying overnight at 105° C., approximately 20 to 30%, by weight, of triethylamine remains in the oil. This result is accurately predicted by Raoult's Law. However, when the oil-amine mixture is heated to a temperature at which the mixture begins to smoke, for example 200° C. or more, the triethylamine is not removed completely as expected. According to Raoult's Law, heating of the oil-amine mixture under such conditions would result in only approximately 0.8%, by weight, of amine remaining in the oil. In practice, however, approximately 8 to 15%, by weight, remains. Further heating does not remove the amine but instead leads to decomposition of the amine.

Thus, the methods known in the art for removing amine from an oil-amine mixture are unsatisfactory because they result in a loss of amine and contamination of the oil. There exists a need for a method of removing amine from an oil-amine mixture which does not result in a loss of amine and in which the resulting oil substantially amine-free.

SUMMARY OF THE INVENTION

It is therefore an object of the present invention to provide a method for removing amine from an oil-amine mixture which minimizes loss of amine and which results in low level residual amine in the oil.

It is a further object of the present invention to describe a unique arrangement of apparatus that has been designed by which the method disclosed herein can be easily utilized and controlled.

It is a further object of the present invention to provide a unique method of monitoring the steps needed to effect the separation.

It is yet another object of the present invention to provide a method for using water to remove amine from an oil-amine mixture and to provide a method for controlling the amount of water necessary to effect such a separation.

The present invention is a method for using water to remove amine from an oil-amine component produced in known processes. The method of the present invention is particularly useful when used along with known processes for breaking emulsions containing oils and water and for breaking sludges containing oil, water and solid matter, which said known processes use an amine or mixture of amines having an inverse critical solution temperature with water to effect the separation. In the process for breaking emulsions containing oil and water, the steps of the process include mixing the emulsion with an amine having an inverse critical solution temperature with water to form a single-phase mixture, where said mixture has a temperature below the inverse critical solution temperature of the amine. This is followed by the step of increasing the temperature of the single-phase mixture above the inverse critical solution temperature of the amine to yield a water component having small amounts of amine, and an oil-amine component having small amounts of water. The water component is then separated from the oil-amine component.

In the known process for breaking sludges containing oil, water and solid matter, the steps of the known process include mixing the sludge with an amine having an inverse critical solution temperature with water to form a mixture, where the mixture has a temperature below the inverse critical solution temperature of the amine. At a temperature below the inverse critical solution temperature of the amine, the solid matter is separated from the mixture, leaving a single-phase mixture. This is followed by the step of raising the temperature of the single-phase mixture above the inverse critical solution temperature of the amine to yield a water component having small amounts of amine, and an oil-amine component having small amounts of water. The water component is then separated from the oil-amine component.

The amines used in the prior art process have an inverse critical solution temperature with water and may have the formula

wherein:
R₁ is hydrogen or alkyl;
R₂ and R₃ are alkyl radicals having from one to six carbon atoms or alkenyl radicals having from two to six carbon atoms; and
the total number of carbon atoms is in the range of three to seven, inclusive.
One such amine is triethylamine.

The present invention is a method for using water to remove the amine from an oil-amine component, such as those produced in the known processes described above. The present invention also describes a method for controlling the amount of water necessary to effect such a separation. In addition, the present invention also describes an apparatus for removing an amine, or a mixture of amines, from an oil-amine component using water to effect such a separation and an apparatus for controlling the amount of water necessary to effect the separation. The method of the present invention includes the steps of adding water to the oil-amine component to form a water-oil-amine mixture where the amount of water added is sufficient to produce a water-amine azeotrope with substantially all the amine in the oil-amine component; and heating the water-oil-amine mixture to remove the water-amine azeotrope. The step of adding water may be adding liquid water or adding steam. The step of heating may be done in a device which allows simultaneous heating and mass transfer. At least one of the mass transfer devices may be an evaporator; examples of such an evaporator are a rising film evaporator and a falling film evaporator. Alternatively, or in combination with an evaporator, at least one of the mass transfer devices may be a distillation column, such as a reboiled multistage distillation column. The step of heating may also include adding steam to a distillation column. The addition of steam in this manner not only provides heat but also adds water to the system. A variation on the method of the present invention includes the step of heating the oil-amine component before the step of adding water. The step of heating the oil-amine component may use an evaporator, such as a rising film evaporator or a falling film evaporator. The method of the present invention may be used to remove amine from an oil-amine component even when the amount of amine in the oil-amine component is 10% or less, by weight.

The method of the present invention may also include the step of determining whether the amount of water added is sufficient to form a water-amine azeotrope with substantially all the amine in the oil-amine component. The step of determining whether the amount of water added is sufficient includes measuring the amount of amine present in the oil-amine component, for example by gas chromatography, and measuring the amount of water added to the oil-amine component, such as by use of a flowmeter. The step of determining whether the amount of water added is sufficient may also include measuring the specific gravity of the water-oil-mixture before the step of heating. The specific gravity of the water-oil-amine mixture will depend, of course, on the specific gravity of the oil. where the specific gravity of the oil is about 0.9, and Where the amine is triethylamine and sufficient water has been added to the oil-amine component to produce a water-amine azeotrope with substantially all the amine in the oil-amine component, the specific gravity of the water-oil-amine mixture will be approximately 0.73 to /78, at 135° F.

The present invention also describes alternative methods of determining whether the amount of water added is sufficient. For example, where the step of heating uses an evaporator, during the step of heating vapors will exit the evaporator. The temperature of the vapors exiting the evaporator will give an indication of the content of the vapors. Where the temperature of the vapors is approximately equal to the boiling temperature of the water-amine azeotrope, the vapors exiting the evaporator consist substantially of azeotrope. For example, where the amine is triethylamine, the temperature of the vapors exiting the evaporator, in a preferred operation of the present invention, will be about 169-171 degrees F.

A similar method may be used where the step of heating uses a distillation column. Vapors exit the distillation column during the step of heating, and a measurement of the temperature of the vapors gives an indication of the composition of the vapors. Where the temperature of the vapors is approximately equal to the boiling temperature of the water-amine azeotrope, the vapors exiting the distillation column consist substantially of azeotrope. For example, where the amine is triethylamine, the temperature of the vapors exiting the distillation column, in a preferred operation of the present invention, will be about 175-185 degrees F. As described in greater detail below, it is preferable to operate the system such that a slight excess of water is added to ensure nearly complete removal of the amine from the oil-amine component. This slight excess of water is the reason for the slightly higher temperature of the vapors exiting a distillation column than for those exiting the evaporator. Because of the excess water, the temperature of the vapors exiting the distillation column could be as high as 212° F.; however, such a high temperature would indicate a noneconomical operation of the column.

Another method for determining whether the amount of water added is sufficient includes measuring the temperature of the oil remaining after the step of heating to remove substantially all the water-amine azeotrope. If the amount of water added is not sufficient, the temperature of the oil will be too high.

The present invention, as described above, may be used to remove amine from any oil-amine mixture, such as those produced in the known processes described above for breaking emulsions and sludges.

The present invention also includes an apparatus for removing amine from an oil-amine mixture, including a means for adding water to the oil-amine mixture to form a water-oil-amine mixture; means for controlling the amount of water added so that the amount of water added is sufficient to produce a water-amine azeotrope with substantially all the amine in the oil-amine mixture; and a means for heating the water-oil-amine mixture to produce a water-oil-amine azeotrope. The means for heating may be one or more devices allowing simultaneous heating and mass transfer. One such mass transfer device is an evaporator, for example a rising film evaporator, or a falling film evaporator. Another such device is a distillation column, such as a reboiled multistage distillation column. For example, the means for heating may include an evaporator and a multistage distillation column.

The means for controlling the amount of water added may include a means for measuring the amount of amine in the oil-amine mixture, such as a gas chromatograph, and a means for measuring the amount of water added to the oil-amine component, for example, a flowmeter. The means for controlling the amount of water added may also include a means for measuring the specific gravity of the water-oil-amine mixture. In addition, the means for controlling the amount of water added may include means for measuring the temperature of vapors exiting the means for simultaneous heating, and mass transfer such as an evaporator or a distillation column.

BRIEF DESCRIPTION OF THE DRAWINGS

The FIGURE represents a schematic depiction of the apparatus of the present invention, showing the steps of the methods of the present invention, including the steps of adding water, heating, and determining whether the amount of water added is sufficient.

BEST MODE FOR CARRYING OUT THE INVENTION

Figure 1:
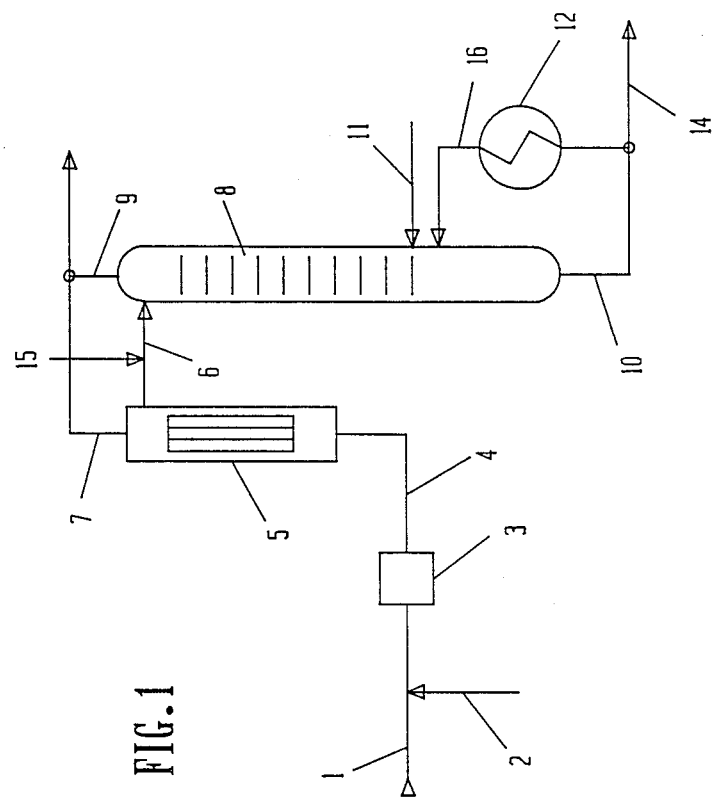

The present invention is a method for using water to remove an amine from an oil-amine component, such as an oil-amine component produced using known methods for breaking emulsions and sludges using an amine, or mixture of amines, having an inverse critical solution temperature with water. The water in the sludges may be bound or unbound. Emulsions, as the term is used in this disclosure, include emulsions containing water and oily materials including oils, greases, fats, fatty materials and the like from animal, vegetable or petroleum sources. Oil-in-water and water-in-oil emulsions are included. Sludges, as the term is used in the present invention, includes emulsions as described above with the addition of solid matter, in particular or finely divided form. Some typical sludges are sewage sludge, petroleum sludge and industrial sludges, including those sludges having hazardous compounds, such as PCB's, and sludges listed by the U.S. Environmental Protection Agency as hazardous wastes in categories K001, K048, K049, K050, K051 and K052 of the Resource Conservation and Recovery Act.

According to prior art processes for breaking emulsions containing oil and water, the emulsion is mixed with an amine or a mixture of amines having an inverse critical solution temperature with water, so that the temperature of the resulting mixture is below the inverse critical solution temperature of the amine. The resulting mixture is more or less single-phase. The temperature of the single-phase mixture is then increased above the inverse critical solution temperature of the amine to produce two components: a water component having small amounts of amine, and an oil-amine component having small amounts of water. The water component is separated from the oil-amine component and is further processed or disposed of as desired. The oil-amine component may be used in other known processes and may be further processed, as in the present invention.

The prior art processes for breaking sludges are very similar to the processes described above for breaking emulsions, with the following addition. After the amine is added to the sludge to produce a mixture having a temperature below the inverse critical solution temperature of the amine, the solid matter is separated from the remainder of the mixture by known methods, such as centrifugation or filtration. The remainder of the mixture is more or less single-phase and contains water, oil, and amine. This water-oil-amine is typically processed as described above.

The preferred amine for the prior art processes exhibit the above-described inverse critical solution temperature with water. The most preferred amines are those which exhibit an inverse critical solution temperature at or near atmospheric pressure at prevailing ambient temperatures. Below the inverse critical solution temperature, the water and amine are completely miscible in all proportions. Above the inverse critical solution temperature, the amines and water will separate into two distinct phases, one phase being primarily amine with a small amount of water and solution therewith and the other phase being primarily water with a small amount of amine dissolved therewith.

More particularly, the preferred amines of the prior art processes comprise a member or mixture of members from a group of amines having the formula

wherein $R_1$ can be hydrogen or alkyl, $R_2$ and $R_3$ can independently be alkyl radicals having from one to six carbon atoms or alkenyl radicals having from two to six carbon atoms where the total number of carbon atoms in the amine molecule is in the range of from three to seven, inclusive. Exemplary of these amines are triethylamine and di-isopropylamine with the most preferred being triethylamine. A two-phase system of triethylamine with water is characterized by an inverse critical solution temperature at a pressure of 760 mm of mercury of approximately 18.7° C. (approximately 66° F).

The present invention uses water to effect the separation of amine from an oil-amine component, or mixture. A surprising feature of the present invention is that while the ultimate goal of the prior art process is the removal of water, the present invention includes the addition of water at a point in the prior art process where most of the water has already been removed. Water is used in the present invention to form an azeotrope with substantially all the amine in the oil-amine mixture, which said azeotrope is separated from the oil by heating.

While of the objects of present invention may be achieved simply by the addition of water and heating to remove the water-amine azeotrope, it is desirable to control the amount of water added to maximize removal of the amine and at the same time minimize the amount of water remaining after the amine has been removed from the oil. A preferred embodiment of the present invention achieves the proper control and is described below with reference to the FIGURE.

The FIGURE shows schematically the preferred embodiment of the present invention. The oil-amine component stream enters at 1. Liquid water 2 is added to the oil-amine component to form a water-oil-amine mixture which moves to analyzer 3. Use of the analyzer is one method for determining whether sufficient water has been added. In the preferred embodiment of this invention, the analyzer determines the specific gravity of the water-oil-amine mixture, which gives an indication of the amount of water in the water-oil-amine mixture. Where the specific gravity of the oil is about 0.9, and where the amine is triethylamine, and where the amount of water added to the oil-amine component to form an azeotrope with substantially all the amine, the specific gravity of the water-oil-amine component is preferably 0.73 to 0.78 at 135° F. Other methods of determining the amount of water in the water-oil-amine mixture may be used including, but not limited to, automatic Karl-Fisher titration to determine water content of stream 4 or actual measurement of flow rate of stream 1 along with controlled flow of water in stream 2 in proportion to stream 1 to achieve a fixed ratio of water to the oil-amine component. The water content of the water-oil-amine mixture in stream 4 is approximately 10% by weight of the amine content. This helps to assure that all the amine will exit the heating systems as an azeotrope.

The first means for heating the water-oil-amine mixture is a rising film evaporator 5 from which vapors exit at 7 during heating. Other evaporators may be used such as falling film evaporators and other evaporators known in the art. If a sufficient amount of water has been supplied at stream 2, substantially all the vapor exiting the rising film evaporator at 7 will be water-amine azeotrope and the temperature of the vapors will be approximately the boiling temperature of the water-amine azeotrope. In the most preferred embodiment of the present invention, the amine is triethylamine and the temperature of the exit vapor at 7 is approximately 169°–171° F. at atmospheric pressure.

The water-oil-amine mixture exits the rising film evaporator at 6 and enters reboiled multistage distillation column 8 from which vapors exit at 9 during heating. Where sufficient water has been added at stream 2 for formation of a water-amine azeotrope, the temperature of the vapors at 9 is approximately equal to, or slightly higher than, the boiling temperature of theater-amine azeotrope. In the most preferred embodiment of the present invention, the amine is triethylamine and the temperature at the top of the column 9 is approximately 175°–185° F. In the most preferred embodiment, the vapors exiting the distillation column at 9 contain an excess amount of water over the requirement for the water-amine azeotrope. This is a control measure used to ensure that substantially all the amine removed from the oil. Hence, the temperature of the vapors exiting the distillation column is slightly higher than the temperature of the vapors exiting the evaporator in the most preferred embodiment.

A further means for insuring nearly total removal of the amine from the oil-amine mixture is through addition of steam 11 to the distillation column. Addition of steam not only provides a source of heating, but also, helps to ensure that sufficient water is added. By monitoring the temperature of the vapors exiting at 9 and by adjusting the distillation column by addition of steam to ensure an exit temperature of 175°–185° F., the system will operate to remove substantially all the amine from the oil-amine mixture.

Heating of the reboiled multistage distillation column 8 is accomplished indirectly through reboiler 12. The oils exits the column at 10 and is recirculated through reboiler 12 where it is heated indirectly and then it reenters the column to undergo further removal of the amine by virtue of azeotroping with water. Upon removal of substantially all the amine, the oil exits at 14 where it can be recycled and used for any desired purpose. The oil at 14 may contain small amounts of water; however, by proper monitoring at analyzer 3 and by proper operation of the rising film evaporator and the distillation column, including proper maintenance of exit temperatures and addition of steam if necessary, the oil exiting at 14 will contain only trace amounts of water.

By careful monitoring at analyzer 3 to maintain stream 4 so that the water content is greater than 10% by weight of the amine content, substantially all of the amine will be removed from the oil-amine component in rising film evaporator 5. Proper addition of water at 2 and proper monitoring of the addition of water at 3 also ensures that sufficient water will be present in column 8 to ensure total removal of the amine as an azeotrope without the necessity for adding steam at 11. However, the preferred embodiment includes the possibility of the addition of steam to ensure proper operation of the column and nearly complete removal of the amine.

In addition to addition of water at points 2 and 11 described earlier, water can be injected at various other locations between 1 and 14 that will effect removal of the amine and thereby practice the invention. Injection at 15 is a suitable location if energy conservation is of paramount concern. Amine would be removed in the evaporator as a nearly pure component, simply by heating, rather than being removed as an azeotrope. A smaller amount of water overall would be injected into the process and, therefore, a smaller amount of water would have to be evaporated. This could be an important energy consideration when one compares the relative energy requirement for evaporating anime and water.

amine- ~130 BTU/lb.;
water- ~950 BTU/lb.

In order to control the amount of water in the oil-amine component charged into distillation column 8, proper monitoring of temperatures at 9 and 10 would be required. As described above, when the amount of water in the column is sufficient to allow nearly total formation of azeotrope, the temperature at the top of the column 9 is approximately the boiling temperature of the azeotrope. The temperature of the oil at 10 is also an indication of proper functioning of the column. Where a sufficient amount of water is present in the oil, the temperature of the oil is maintained at a lower temperature than if the oil is water-free. By practicing the present invention, the amount of amine remaining in the oil is much lower than the amount of amine remaining after prior art processes. Also, by practicing the present invention, the amount of water remaining in the oil is minimal and may be removed by prior art methods, including polishing.

Liquid water may also be injected at various points in the column, including 16. Heat input into the reboiler would be maintained to control trace water levels in the oil. The amount of water injected at 16 could be measured with flow meters to ensure proper balance of water-to-amine content.

EXAMPLES

1. Sludge from an operating petroleum refinery was treated by the above described prior art process using triethylamine as the amine to produce an oil-triethylamine mixture. The oil-triethylamine mixture was heated at 100 degrees C. to remove triethylamine. An oil product was obtained after removal of the triethylamine had apparently ceased. When the oil was analyzed for residual triethylamine, about 250,000 ppm or 25%, by weight, of triethylamine was found. In an attempt to remove the remaining triethylamine, the oil was heated strongly to the smoke point (above 200 degrees C.) and the temperature was maintained for about thirty minutes. Analysis showed 80,000 ppm. or 8%, by weight, of triethylamine remaining.

2. Sludge from an operating petroleum refinery was treated by the above described prior art process using triethylamine as the amine to produce an oil-triethylamine mixture. In a laboratory, liquid water was added to the oil-triethylamine mixture, in an amount such that the specific gravity was about 0.73 to 0.788. The water-oil-triethylamine mixture was then heated to remove the triethylamine as an azeotrope with water. After the distillation, the residual triethylamine in the oil was less than 400 ppm, or 0.04%, by weight.

From the foregoing, it will be appreciated that, although embodiments of the invention have been described herein for purposes of illustration, various modifications may be made without deviating from the spirit and scope of the invention. Accordingly, the invention is not limited except as by the appended claims.

We claim:

1. In the process for breaking an emulsion containing oil and water, including the steps of:
   mixing the emulsion with an amine having an inverse critical solution temperature with water to form a single-phase mixture, where said mixture has a temperature below the inverse critical solution temperature of the amine;
   increasing the temperature of said mixture above the inverse critical solution temperature of the amine to yield a water component having small amounts of water; and
   separating the water component from the oil-amine component using water to separate the amine from the oil-amine component, comprising the steps of:
   adding water to the oil-amine component to form a water-oil-amine mixture, where the amount of water added does not significantly exceed the amount of water sufficient to form a water-amine azeotrope with substantially all the amine in the oil-amine component; and
   heating the water-oil-amine mixture to remove the water-amine azeotrope.

2. The method of claim 1 wherein the step of adding water includes adding liquid water.

3. The method of claim 1 wherein the step of adding water includes adding steam.

4. The method of claim 1 wherein the step of heating uses an evaporator and a distillation column.

5. The method of claim 1 wherein the amount of amine in the oil-amine component is about 10% or less, by weight.

6. The method of claim 1 wherein the step of heating uses one or more devices allowing simultaneous heating and mass transfer.

7. The method of claim 6 wherein at least one device allowing simultaneous heating and mass transfer is an evaporator.

8. The method of claim 7 wherein the evaporator is a rising film evaporator.

9. The method of claim 7 wherein the evaporator is a falling film evaporator.

10. The method of claim 6 wherein at least one device allowing simultaneous heating and mass transfer is a distillation column.

11. The method of claim 10 wherein the distillation column is a reboiled multistage distillation column.

12. The method of claim 11 further comprising the step of adding steam to the reboiled multistage distillation column.

13. The method of claim 1 further comprising the step of heating the oil-amine component to remove at least a portion of the amine before the step of adding water.

14. The method of claim 13 wherein the step of heating the oil-amine component uses an evaporator.

15. The method of claim 14 wherein the evaporator is a rising film evaporator.

16. The method of claim 14 wherein the evaporator is a falling film evaporator.

17. The method of claim 1 wherein the amine is selected from the group of amines having the formula:

wherein:
   $R_1$ is hydrogen or alkyl;
   $R_2$ and $R_3$ are alkyl radicals having from one to six carbon atoms or alkenyl radicals having from two to six carbon atoms; and
   the total number of carbon atoms in the molecule being in the range of from three to seven, inclusive.

18. The method of claim 17 wherein the amine is triethylamine.

19. The method of claim 1 further comprising the step of determining whether the amount of water added is sufficient to form a water-amine azeotrope with substantially all the amine in the oil-amine component.

20. The method of claim 19 wherein the step of determining whether the amount of water added is sufficient includes measuring the temperature of the oil remaining after the step of heating to remove substantially all the water-amine azeotrope.

21. The method of claim 19 wherein the step of determining whether the amount of water added is sufficient includes measuring the amount of amine present in the oil-amine component and measuring the amount of water added.

22. The method of claim 21 wherein the step of measuring the amount of amine uses gas chromatography.

23. The method of claim 19 wherein the step of determining whether the amount of water added is sufficient includes measuring the specific gravity of the water-oil-amine mixture before the step of heating.

24. The method of claim 23 wherein the amine is triethylamine and the step of adding water includes adding sufficient water to yield a specific gravity of the water-oil-amine mixture of approximately 0.73 to 0.78 at 135° F.

25. The method of claim 19 wherein the step of heating uses an evaporator from which vapor exits, and wherein the step of determining whether the amount of water added is sufficient includes measuring the temperature of the vapor exiting the evaporator.

26. The method of claim 25 wherein the step of adding water includes adding sufficient water such that the temperature of the vapor exiting the evaporator is approximately equal to the boiling temperature of the water-amine azeotrope.

27. The method of claim 26 wherein the amine is triethylamine and the step of adding water includes adding sufficient water such that the temperature of the vapor exiting the evaporator is approximately 169°–171° F.

28. The method of claim 19 wherein the step of heating uses a multistage distillation column from which vapor exits, and wherein the step of determining whether the amount of water added is sufficient includes measuring the temperature of the vapor exiting the multistage distillation column.

29. The method of claim 28 wherein the step of adding water includes adding sufficient water such that the temperature of the vapor exiting the multistage distillation column is approximately equal to the boiling temperature of the water-amine azeotrope.

30. The method of claim 29 wherein the amine is triethylamine and the step of adding water includes adding sufficient water such that the temperature of the vapor exiting the distillation column is approximately 175°–185° F.

31. In the process for breaking a sludge containing oil, water and solid matter, including the steps of:
mixing the sludge with an amine having an inverse critical solution temperature with water to form a mixture, where said mixture has a temperature below the inverse critical solution temperature of the amine;
at a temperature below the inverse critical solution temperature of the amine, separating the solid matter from the mixture, leaving a single-phase mixture;
increasing the temperature of the single-phase mixture above the inverse critical solution temperature of the amine to yield a water component having small amounts of amine and an oil-amine component having small amounts of water; and
separating the water component from the oil-amine component, using water to separate the amine from the oil-amine component, comprising the steps of:
adding water to the oil-amine component to form a water-oil-amine component, comprising the steps of:
adding water to the oil-amine component to form a water-oil-amine mixture, where the amount of water added does not significantly exceed the amount of water sufficient to produce a water-amine azeotrope with substantially all the amine in the oil-amine component; and
heating the water-oil-amine mixture to remove the water-amine azeotrope.

32. The method of claim 31 wherein the step of adding water includes adding liquid water.

33. The method of claim 31 wherein the step of adding water includes adding steam.

34. The method of claim 31 wherein the step of heating uses an evaporator and a distillation column.

35. The method of claim 31 wherein the amount of amine in the oil-amine component is about 10% or less, by weight.

36. The method of claim 31 wherein the step of heating uses one or more devices which allow simultaneous heating and mass transfer.

37. The method of claim 36 wherein at least one device allowing simultaneous heating and mass transfer is an evaporator.

38. The method of claim 37 wherein the evaporator is a rising film evaporator.

39. The method of claim 37 wherein the evaporator is a falling film evaporator.

40. The method of claim 36 wherein at least one device allowing simultaneous heating and mass transfer is a distillation column.

41. The method of claim 40 wherein the distillation column is a reboiled multistage distillation column.

42. The method of claim 41 further comprising the step of adding steam to the reboiled multistage distillation column.

43. The method of claim 31 further comprising the step of heating the oil-amine component to remove at least a portion of the amine before the step of adding water.

44. The method of claim 43 wherein the step of heating the oil-amine component uses an evaporator.

45. The method of claim 44 wherein the evaporator is a rising film evaporator.

46. The method of claim 44 wherein the evaporator is a falling film evaporator.

47. The method of claim 31 wherein the amine is selected from a group of amines having the formula:

wherein:
$R_1$ is hydrogen or alkyl;
$R_2$ and $R_3$ are alkyl radicals having from one to six carbon atoms or alkenyl radicals having from two to six carbon atoms; and
the total number of carbon atoms in the molecule being in the range of from three to seven, inclusive.

48. The method of claim 47 wherein the amine is triethylamine.

49. The method of claim 31 further comprising the step of determining whether the amount of water added is sufficient to form a water-amine azeotrope with substantially all the amine in the oil-amine component.

50. The method of claim 49 wherein the step of determining whether the amount of water added is sufficient includes measuring the amount of amine present in the oil-amine component and measuring the amount of water added.

51. The method of claim 49 wherein the step of determining whether the amount of water added is sufficient includes measuring the temperature of the oil after substantially all of the water-amine azeotrope has been removed.

52. The method of claim 49 wherein the step of measuring the amount of amine uses gas chromatography.

53. The method of claim 49 wherein the step of determining whether the amount of water added is sufficient includes measuring the specific gravity of the water-oil-amine mixture before the step of heating.

54. The method of claim 53 wherein the amine is triethylamine and the step of adding water includes adding sufficient water so that the specific gravity of the water-oil-amine mixture is approximately 0.73 to 0.78 at 135° F.

55. The method of claim 49 wherein the step of heating uses an evaporator from which vapor exits and the step of determining whether the amount of water added is sufficient includes measuring the temperature of the vapor exiting the evaporator.

56. The method of claim 55 wherein the step of adding water includes adding sufficient water such that the temperature of the vapor exiting the evaporator is approximately equal to the boiling temperature of the water-amine azeotrope.

57. The method of claim 56 wherein the amine is triethylamine and the step of adding water includes adding sufficient water such that the temperature of the vapor exiting the evaporator is approximately 169°–171° F.

58. The method of claim 49 wherein the step of heating uses a multistage distillation column from which vapor exits and the step of determining whether the amount of water added is sufficient includes measuring the temperature of the vapor exiting the distillation column.

59. The method of claim 58 wherein the step of adding water includes adding sufficient water such that the temperature of the vapor exiting the distillation column is approximately equal to the boiling temperature of the water-amine azeotrope.

60. The method of claim 59 wherein the amine is triethylamine and the step of adding water includes adding sufficient water such that the temperature of the vapor exiting the distillation column is approximately 175°–185° F.

* * * * *